United States Patent
Alici et al.

(10) Patent No.: US 12,533,338 B2
(45) Date of Patent: Jan. 27, 2026

(54) ENHANCED GENE DELIVERY TO NATURAL KILLER CELLS, HEMATOPOIETIC STEM CELLS AND MACROPHAGES

(71) Applicant: VYCELLIX, INC., Boca Raton, FL (US)

(72) Inventors: Evren Alici, Nykoping (SE); Adil Duru, Pembroke Pines, FL (US); Tolga Sutlu, Kadikoy Istanbul (TR)

(73) Assignee: VYCELLIX, INC., Boca Raton, FL (US)

( * ) Notice: Subject to any disclaimer, the term of this patent is extended or adjusted under 35 U.S.C. 154(b) by 2285 days.

(21) Appl. No.: 15/940,847

(22) PCT Filed: Sep. 30, 2016

(86) PCT No.: PCT/US2016/054618
§ 371 (c)(1),
(2) Date: Mar. 29, 2018

(87) PCT Pub. No.: WO2017/059177
PCT Pub. Date: Apr. 6, 2017

(65) Prior Publication Data
US 2019/0262309 A1    Aug. 29, 2019

Related U.S. Application Data

(60) Provisional application No. 62/235,427, filed on Sep. 30, 2015.

(51) Int. Cl.
| | |
|---|---|
| *A61K 31/365* | (2006.01) |
| *A61K 9/00* | (2006.01) |
| *A61K 31/13* | (2006.01) |
| *A61K 31/427* | (2006.01) |
| *A61K 31/5365* | (2006.01) |
| *A61K 31/7105* | (2006.01) |
| *A61K 35/76* | (2015.01) |
| *A61K 40/10* | (2025.01) |
| *A61K 40/15* | (2025.01) |
| *A61K 40/17* | (2025.01) |
| *A61K 40/24* | (2025.01) |
| *A61K 40/42* | (2025.01) |
| *A61K 40/46* | (2025.01) |
| *A61K 48/00* | (2006.01) |
| *A61P 35/02* | (2006.01) |
| *C12N 5/0735* | (2010.01) |
| *C12N 5/0783* | (2010.01) |
| *C12N 5/0786* | (2010.01) |
| *C12N 15/86* | (2006.01) |
| *C12N 15/867* | (2006.01) |
| *A61K 45/06* | (2006.01) |

(52) U.S. Cl.
CPC .......... *A61K 31/365* (2013.01); *A61K 9/0019* (2013.01); *A61K 31/13* (2013.01); *A61K 31/427* (2013.01); *A61K 31/5365* (2013.01); *A61K 31/7105* (2013.01); *A61K 35/76* (2013.01); *A61K 40/10* (2025.01); *A61K 40/15* (2025.01); *A61K 40/17* (2025.01); *A61K 40/24* (2025.01); *A61K 40/42* (2025.01); *A61K 40/46* (2025.01); *A61K 48/0008* (2013.01); *A61P 35/02* (2018.01); *C12N 5/0606* (2013.01); *C12N 5/0645* (2013.01); *C12N 5/0646* (2013.01); *C12N 15/86* (2013.01); *C12N 15/867* (2013.01); *A61K 45/06* (2013.01); *C12N 2740/10041* (2013.01); *C12N 2740/15043* (2013.01)

(58) Field of Classification Search
None
See application file for complete search history.

(56) References Cited

U.S. PATENT DOCUMENTS

| | | |
|---|---|---|
| 2008/0254008 A1 | 10/2008 | Dropulic et al. |
| 2013/0071414 A1 | 3/2013 | Dotti et al. |
| 2014/0243403 A1 | 8/2014 | Singh et al. |

FOREIGN PATENT DOCUMENTS

| | | |
|---|---|---|
| WO | 2008/018517 A1 | 2/2008 |
| WO | 2014/127026 A1 | 8/2014 |
| WO | 2014/172616 A2 | 10/2014 |
| WO | 2015/052714 A1 | 4/2015 |

OTHER PUBLICATIONS

Rajasekaran et al, Transforming Growth Factor—activated Kinase 1 Regulates Natural Killer Cell-mediated Cytotoxicity and Cytokine Production, The Journal of Biological Chemistry, 2011, vol. 286, No. 36: 31213-31224 (Year: 2011).*

Alici et al., "Retroviral gene transfer into primary human natural killer cells," *Methods Mol. Biol.*, 506, 2009, pp. 127-137.

(Continued)

*Primary Examiner* — Ekaterina Poliakova-Georgantas

(74) *Attorney, Agent, or Firm* — Greenblum & Bernstein. P.L.C.

(57) ABSTRACT

The present invention comprises a method of downregulating intracellular defenses by administering (5Z)-7-Oxozeaenol. This allows for improved delivery of RNA based gene vectors to natural killer, stem and macrophage cells. The resulting cells can be used in adoptive cell transfer therapies. Also provided are methods of treating virally induced inflammation via administration of (5Z)-7-Oxozeaenol together with an anti viral therapeutic.

15 Claims, 14 Drawing Sheets
Specification includes a Sequence Listing.

(56) References Cited

OTHER PUBLICATIONS

Brandstadter et al., "Natural killer cell responses to viral infection," *J. Innate Immun.*, 3, 2011, pp. 274-279.
Clark et al., "Use of the pharmacological inhibitor BX795 to study the regulation and physiological roles of TBK1 and IkappaB kinase epsilon: a distinct upstream kinase mediates Ser-172 phosphorylation and activation," *J. Biol. Chem.*, 284, 2009, pp. 14136-14146.
Lanier, L.L., "Evolutionary struggles between NK cells and viruses," *Nat. Rev. Immunol.*, 8, 2008, pp. 259-268.
Pegram, et al., "Genetic modification of natural killer cells for adoptive cellular immunotherapy," *Immunotherapy*, 1, 2009, pp. 623-630.
Sutlu, et al., "Inhibition of intracellular antiviral defense mechanisms augments lentiviral transduction of human natural killer cells: implications for gene therapy," *Hum. Gene Ther.*, 23, 2012, pp. 1090-1100.
International Search Report dated May 22, 2017, issued in PCT/US2016/054618.
International Preliminary Report on Patentability dated Apr. 3, 2018, including Written Opinion dated May 22, 2017, issued in PCT/US2016/054618.
Aiuti et al. "Lentivirus-based Gene Therapy of Hematopoietic Stem cells in Wiskott-Aldrich Syndrome," *Science*, 341, 2013 (6148):1233151.
Fan et al. "TAK1 inhibitor 5Z-7-oxozeaenol sensitizes neutoblastoma to chemotherapy," *Apoptosis*, 18, 2013, pp. 1224-1234.
Ninomiya-Tsuji et al., "A resorcyclic 1 acid lactone, 5Z-7-oxozeaenol, prevents inflammation by inhibiting the catalytic activity of TAKI MAPK kinase kinase," *J. Biol. Chem.*, 278 (20), 2003, pp. 18485-18490.
Office Action issued Dec. 16, 2020 in Israeli patent application No. 258342, with English translation thereof.
Office Action issued Mar. 22, 2022 in Australian patent application No. 2016331082.
Office Action issued Nov. 18, 2022 in Canadian patent application No. 2,999,891.
Office Action issued Oct. 26, 2023 in Canadian patent application No. 2,999,891.
Supplementary European Search Report dated Mar. 18, 2019, issued in European patent application No. EP 16852663.
Office Action issued Feb. 27, 2020 in European patent application No. EP 16852663.
Office Action issued Jan. 31, 2022 in Indian patent application No. 201817012596.
Office Action issued Nov. 14, 2023 in Indian patent application No. 201817012596.
Office Action issued Feb. 5, 2024 in Korean patent application No. 10/2018-7012395.
Burduli et al., "Transient TBK1 blockade enhances susceptibility of NK cells and T cells to genetic modification," Karolinska Institutet, 2022.
Office Action issued Apr. 29, 2024 in Brazilian patent application No. BR112018006026-7, with machine translation thereof.
Office Action dated Feb. 4, 2024 issued in Korean patent application No. 10-2018-7012395, with English translation thereof.
Hrabe et al., "Disruption of thioredoxin metabolism enhances the toxicity of transforming growth factor β-activated kinase 1 (TAK1) inhibition in KRAS-mutated colon cancer cells," *Redox Biology*, 5, 2015, pp. 319-327.
Rasjasekaran et al., "Transforming Growth Factor-β-activated Kinase 1 Regulates Natural Killer Cell-mediated Cytotoxicity and Cytokine Production," *The Journal of Biological Chemistry*, vol. 286, No. 36, Sep. 9, 2011, pp. 31213-31224.
Ninomiya-Tsuji et al., "A Resorcylic Acid Lactone, 5Z-7-Oxozeaenol, Prevents Inflammation by Inhibiting the Catalytic Activity of TAK1 MAPK Kinase Kinase," *The Journal of Biological Chemistry*, vol. 278, No. 20, May 16, 2003, pp. 18485-18490.
Quan et al., "AICAR Enhances the Phagocytic Ability of Macrophages towards Apoptotic Cells through P38 Mitogen Activated Protein Kinase Activation Independent of AMP-Activated Protein Kinase," *PLoS One* 10(5): e0127885. doi: 10.1371/journal.pone.012788, 2015.
Ansell et al., "Activation of TAK1 by MYD88 L265P drives malignant B-cell Growth in non-Hodgkin lymphoma," *Blood Cancer Journal* (2014), 4, e183; doi:10.1038/bcj.2014.4.
Tam et al., "Intracellular immunity: finding the enemy within—how cells recognize and respond to intracellular pathogens," *Journal of Leukocyte Biology*, vol. 96, Aug. 2014, pp. 233-244.
Van Beunigen et al., "Inhibition of TAK1 and/or JAK Can Rescue Impaired Chondrogenic Differentiation of Human Mesenchymal Stem Cells in Osteoarthritis-Like Conditions," *Tissue Engineering*, Part A vol. 20, Nos. 15 and 16, 2014.
Examination Report dated Jun. 6, 2025, issued in Australian patent application No. 2023203314.
Office Action dated Feb. 19, 2025, issued in Brazilian patent application No. BR122024005881-2, with partial English Translation thereof.
Office Action dated Jun. 30, 2025 in Brazilian patent application No. BR122024005881-2, with partial English translation thereof.

\* cited by examiner

Transduction efficiency is increased significantly in primary NK cells and NK92 cell line with BX or iX

BX795 and iX dose titration in NK92 cells iX is less toxic than BX795

Small molecule inhibitors decrease RIG-I and IRF3

ENHANCED GENE DELIVERY TO NATURAL KILLER CELLS, HEMATOPOIETIC STEM CELLS AND MACROPHAGES

PRIORITY AND INCORPORATION BY REFERENCE

This application is a 371 application of Patent Cooperation Treaty application number PCT/US16/54618 filed on Sep. 30, 2016 which claims priority to provisional application No. 62/235,427 filed on Sep. 30, 2015. All references cited herein are expressly incorporated by reference.

BACKGROUND

Natural killer (NK) cells are lymphocytes of the innate immune system. They are cytokine-producing and have cytotoxic ability to kill both viral infected or tumor cells. Thus, adoptive immunotherapy using NK cells is a promising approach for cancer treatment. In the last decade, several NK cell based anti-cancer products have been taken to clinical trial stage with promising clinical outcomes. However, in order to manufacture more efficient NK cell therapy products it is essential to develop novel strategies such as genetic modification of NK cells. Moreover, the use of genetically modified NK cells that have been redirected to tumor targets via the introduction of either activating or chimeric antigen receptors presents an attractive prospect for further clinical applications (Pegram et al., 2009). Introduction of genes expressing various cytokines for enhancement of in vivo survival and cytotoxicity of adoptively transferred NK cells are also among various approaches. The problem remains that NK cells are inherently resistant to retroviral infections (Lanier 2008; Alici et al, 2009; Brandstadler and Yang, 2011; Sutlu et al, 2012) While enhanced retroviral and lentiviral gene delivery to NK cells through enhanced proliferation and targeting intracellular viral defense mechanism by small molecule inhibitors has been shown (Sutlu et al., 2012). It is also a problem to deliver genetic materials via viral vectors to macrophages and stem cells. There remains a need in the art for more efficient transfection of cells, in particular NK, hematopoietic stem cells and macrophages.

It is an object of the present invention to improve the transfection of cells by co-administering (5Z)-7-Oxozeaenol with a viral vector.

It is an object of the invention to down regulate intracellular defense mechanisms by administering (5Z)-7-Oxozeaenol.

It is an object of the invention to improve adoptive cell transfer therapy by administering (5Z)-7-Oxozeaenol to cells It is an object of the invention to improve transfection of natural killer cells, macrophages and stem cells by administering (5Z)-7-Oxozeaenol to such cells together with a viral vector.

It is an object of the invention to use cells transfected using viral vectors and (5Z)-7-Oxozeaenol to treat human disease.

It is an object of the invention to transduce cells using lentiviral, or retroviral based vectors.

It is an object of the invention to treat cancer and proliferative diseases using cells transfected with (5Z)-7-Oxozeaenol and an RNA viral vector.

It is an object of the invention to treat diseases caused by genetic mutation using cells transfected with (5Z)-7-Oxozeaenol and an RNA viral vector.

It is an object of the invention to treat metabolic disorders using cells transfected with (5Z)-7-Oxozeaenol and an RNA viral vector.

It is an object of the invention to treat inflammation induced by viral infection.

BRIEF DESCRIPTION OF THE INVENTION

The present invention comprises administration of (5Z)-7-Oxozeaenol (iX) in vitro to cells with an RNA viral vector to improve transfection and thereby enhance proliferation of NK, stem cells and macrophages. While not wanting to be limited by any theory it is believed that the increases in genetic modification observed are due to downregulation of intracellular defense mechanisms mediated by Rig I. Cells treated in this manner can be used to treat cancer, diseases caused by a known genetic mutation and metabolic disorders caused by a known genetic mutation.

DETAILED DESCRIPTION OF THE INVENTION

Figure 1:
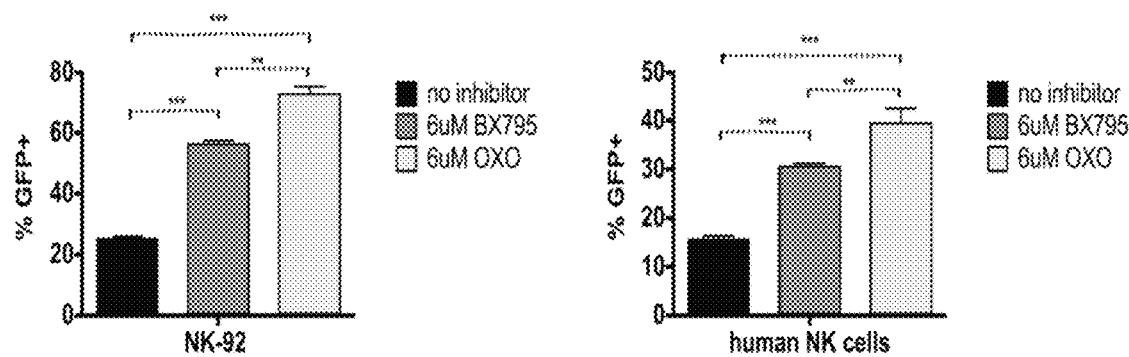
FIG. 1 contains two bar graphs showing the inhibition of innate immune signaling with iX enhances lentiviral transduction efficiency in NK cells. NK-92 cells and primary human NK cells isolated from healthy donor PBMCs were subjected to lentiviral transduction in the presence of 6 µM BX795 or iX for 6 hours. GFP expression is acquired 72 hours later. +cell percentages are shown on graph.

Cell therapy is rapidly becoming a viable means for treatment of mammalian diseases. Unfortunately, many therapeutic applications are limited by the low efficiency in which genes can be delivered to target cells. The use of iX together with the methods below achieves unexpected results. Prior to these experiments it was unknown that a small molecule could target RIG I and down regulate intracellular defense mechanisms. Using the present invention desired genes can be more readily introduced to target cells. It is believed that analogs, derivatives or mimetics of iX would also be effective.

Example 1

Materials and Methods:

Cell Lines:

293FT cells were purchased from Invitrogen (Life Technologies, Grand Island, N.Y., USA) and maintained in Dulbecco's Modified Eagle Medium (DMEM) (GIBCO, Life Technologies, Grand Island, N.Y., USA) supplemented with 10% Fetal Bovine Serum (FBS) (GIBCO), 0.1 mM non-essential amino acids (Sigma-Aldrich, St. Louis, Mo., USA), 6 mM L-glutamine (Sigma-Aldrich), 1 mM sodium pyruvate (Sigma-Aldrich) and 20 mM HEPES (Sigma-Aldrich). NK92 cells were maintained in CellGro SCGM (Cellgenix) medium supplemented with 20% FBS and 1000 U/ml rhIL-2 (Proleukin, Chiron Corporation).

Production of Lentiviral Vectors

For production of VSV-G pseudotyped lentiviral vectors, $14 \times 10^6$ 293 FT cells were plated into a poly-D-lysine coated 150 mm dish (BD Biosciences, San Jose, Calif., USA). Next day cells were transfected with 30 μg of LeGO-G2 plasmid (courtesy of Prof. Boris Fehse, University Medical Center Hamburg-Eppendorf, Hamburg, Germany), 15 μg of pMDLg/pRRE (Addgene, Cambridge, Mass., USA), 10 μg of pRSV-REV (Addgene) and 5 μg of phCMV-VSV-G (Addgene) using calcium phosphate transfection kit (Sigma-Aldrich) in the presence of 25 μM Chloroquine (Sigma-Aldrich). 10 hours after transfection, the medium was changed and thereafter virus containing supernatant was collected every 24 hours for 2-3 days and stored in −80° C. until further use. A small aliquot from each production was used to determine viral titers by transduction of 293FT cells with serially diluted amounts of virus supernatant.

Primary Natural Killer Cell Isolation and Culture

Buffy coats were obtained from healthy donors via the blood bank at the Karolinska University Hospital, Huddinge. The experimental protocol was approved by the local research ethics committee.

The peripheral blood mononuclear cells (PBMCs) were isolated by gradient centrifugation, using Lymphoprep (Nyegaard, Oslo, Norway) and washed twice with phosphate-buffered saline (PBS) (GIBCO, Grand Island, N.Y., USA). Cell count and viability were assessed by Turk and Trypan Blue dye exclusion. NK cells were obtained by using NK cell isolation kit (Miltenyi Biotec, Cologne, Germany) and the AutoMACS machine (Miltenyi Biotec) according to manufacturer's instructions. After isolation, NK cells were put into culture at a concentration of $1 \times 10^6$ cells/ml in CellGro SCGM (Cellgenix) supplemented with 10% Human AB Serum (Lonza, Basel, Switzerland) and 1000 U/ml rhIL-2 (Proleukin, Chiron Corporation). For initial testing of cytokine stimulations prior to transduction (FIG. 1), IL-12 (Peprotech, Rocky Hill, N.J., USA), IL-15 (Peprotech) and IL-21 (Peprotech) were used at a concentration of 20 ng/ml. For the rest of the experiments, only 1000 U/ml rhIL-2 and 20 ng/ml IL-21 were used.

Lentiviral Transduction of Natural Killer Cells

For each lentiviral transduction, $0.25 \times 10^6$ NK cells per well were seeded in a 24-well plate (BD Biosciences) and mixed with an appropriate amount of virus supernatant in the presence of 8 μg/ml of protamine sulfate (Sigma-Aldrich) or polybrene (Sigma-Aldrich) in a final volume of no more than 1 ml. The cytokines were replenished and plates were centrifuged at 1000×g for 1 hour at room temperature. After centrifugation, without removing viral supernatants, the plates were incubated at 37° C., 5% $CO_2$ for 4-6 hours. At the end of the incubation, a second centrifugation at 1000×g for 1 hour at room temperature was carried out, after which the supernatants were removed from the wells and 1 ml of fresh NK cell growth medium (CellGro SCGM supplemented with 10% Human AB Serum) per well was added. The cells were maintained in this medium with daily addition cytokines (IL-2: 1000 U/ml, and IL-21: 20 ng/ml. Combinations of cytokines were used as indicated in FIG. 1. Only IL-2 and IL-21 were used in the rest of the experiments) for at least 3 days before acquisition of eGFP expression was carried out. In indicated experiments, the following inhibitors were present during the transduction: BX795 (Invivogen) and (5Z)-7-Oxozeaenol (iX) (Tocris).

Lentiviral Transduction of NK92 Cell Line

For the transduction of cell lines, $2 \times 10^5$ cells per well were seeded into 24-well plates. Treatment with 6 μM BX795 and (5Z)-7-Oxozeaenol (iX) was initiated simultaneously with the transduction process. Appropriate amount of viral supernatants were added into the wells along with protamine sulfate (NK92, cells) and the total volume was adjusted to 500 μl. The plates were centrifuged at 1000×g for 1 hour followed by incubation at 37° C., 5% $CO_2$ for 4-6 hours, after which the virus containing supernatant was removed and fresh growth media was added. The cells were grown for at least 3 days before acquisition of eGFP expression was carried out.

Gene Editing

The recent emergence of the clustered, regularly interspaced, palindromic repeats (CRISPR) system for gene editing has the potential to overcome these limitations. The CRISPR technology utilizes a fixed nuclease, often the CRISPR-associated protein 9 (Cas9) from *Streptococcus pyogenes*, in combination with a short guide RNA (gRNA) to target the nuclease to a specific DNA sequence. We confirmed that gRNA recognition and thus editing efficacy could be increased with introduction of iX inhibitor. Human primary macrophages, CD34+ HSCs and NK92 cell line were transfected with Cas9-2A-GFP and gRNA encoding plasmids using respective Amaxa kits and cell-specific program using Nucleofector II device (VAPA-1003 for CD34+ HSCs, VAPA-1008 for Macrophages cells, and VVPA-1005 for NK92 cells) according to manufacturer's instructions except in half of the groups, we have added 1 uM iX into the manufacturer's transfection reagent.

The following commercially available guide RNAs from Origene Technologies were tested against Beta 2 Microglobulin: GATGTCTCGCTCCGTGGCCT (Seq. ID No. 1); CTCGCGCTACTCTCTCTTTC (Seq. ID No. 2); GACTCACGCTGGATAGCCTC (Seq. ID No. 3); CCAGAAAGAGAGAGTAGCGC (Seq. ID No. 4) CACAGCTAAGGCCACGGAGC (Seq. ID No. 5); GGCCGAGATGTCTCGCTCCG (Seq. ID No. 6); TTGCGGGAGCGCATGCCTTT (Seq. ID No. 7); CCACCTCTTGATGGGGCTAG (Seq. ID No. 8); ATACCTTGGGTTGATCCACT (Seq. ID No. 9); CGTGAGTAAACCTGAATCTT (Seq. ID No. 10); AAGTCAACTTCAATGTCGGA (Seq. ID No. 11); CATAGATCGAGACATGTAAG (Seq. ID No. 12); GCTACTCTCTCTTTCTGGCC (Seq. ID No. 13); ACCCAAACCAAGCCTTTCTA (Seq. ID No. 14); and TATAAGTGGAGGCGTCGCGC (Seq. ID No. 15). 48 hours post-transfection, cells were stained with anti-B2M antibody (clone:2M2, Biolegend) to compare loss of (32 m expression. Cells were then analysed using flowcytometry as described below.

Flow Cytometry

All antibody stainings for flow cytometry were done according to the following protocol: For surface stainings, the cells were washed once with PBS and incubated with appropriate amounts of antibody at 4° C. for 30 min. The labeled cells were then washed with PBS and fixed in 1% PFA prior to data acquisition. Data acquisition was done on a FACSCalibur (BD Biosciences), CyFlow ML (Partec GmbH, Munster, Germany) and LSRII-Fortessa (BD Biosciences) with standard filters. Data were analysed with the FlowJo software (TreeStar Inc.). The antibodies used for NK cells were, CD56 (NCAM16.2), CD56 (B159), CD3 (SK7), CD3 (SP34-2) from BD Biosciences.

Results and Discussion

Inhibition of Intracellular Innate Immune Sensor Pathways Enhances Lentiviral Gene Delivery Efficiency in NK Cells We have shown that innate immune sensor mediated detection of viral vector components activate an anti-viral response in NK cells, negatively effecting the efficiency of lentiviral transduction. We successfully used small molecule inhibitors of innate immune signaling during lentiviral transduction to deactivate or reduce the anti-viral response.

As we have previously reported (Sutlu et al., 2012), the use of BX795 dramatically increases transduction efficiency in NK cells. BX795 is an inhibitor of TBK1/IKKε complex that acts as a common mediator in the signaling pathways of RIG-I, MDA-5 and TLR3 (Clark, et al. 2009). Therefore, it might be possible to state that the lentiviral RNA is recognized by one or more of these receptors and an anti-viral response is triggered, which can be inhibited by the use of BX795.

Here we show that the use of the TAK1 inhibitor iX enhances lentiviral gene delivery to NK cells to a further extent compared to BX795. When used at a 6 μM concentration during lentiviral transduction, iX provides a statistically significant improvement in gene delivery to both primary human NK cells and the human NK cell line NK-92 (FIG. 1).

Taken together, these results support the hypothesis that during transduction, intracellular anti-viral defense mechanisms are activated and contribute significantly to the resistance of NK cells to lentiviral genetic modification. The inhibition of this response using small molecule inhibitors significantly enhances the gene delivery efficiency.

Figure 7:
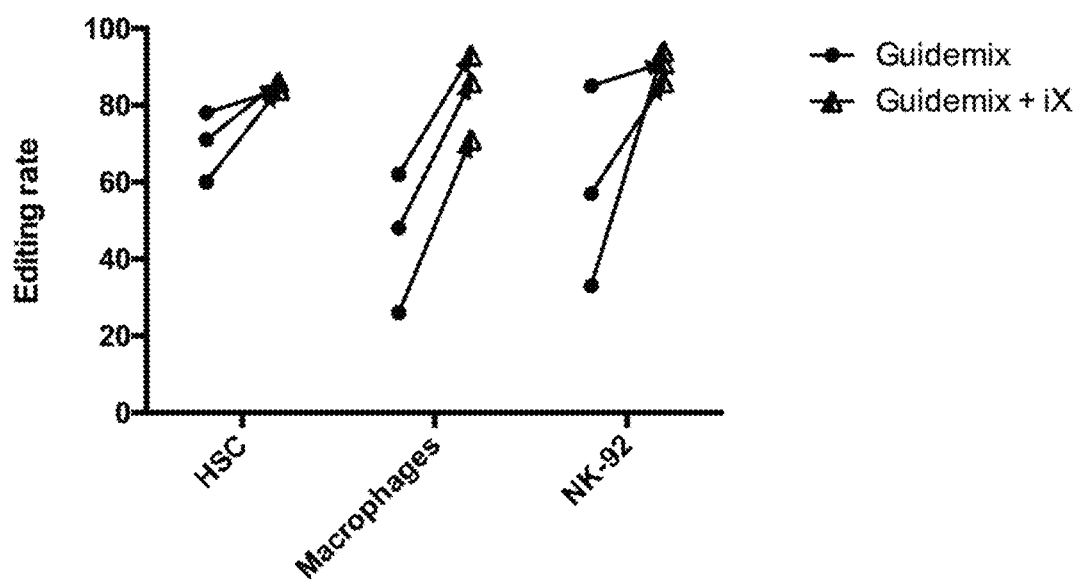
FIG. 7 is a graph showing that administration of iX increases gene editing.

We have shown that iX increases gene editing efficacy in hematopoietic stem cells, macrophages and NK cells. Testing iX at 1 μM level for a short period of time has increased ß2M editing significantly in all three cell types. The results are summarized in FIG. 7 (n=4).

iX Shows a Dose Dependent Effect with Minimal Toxicity to NK Cells

Figure 2A:
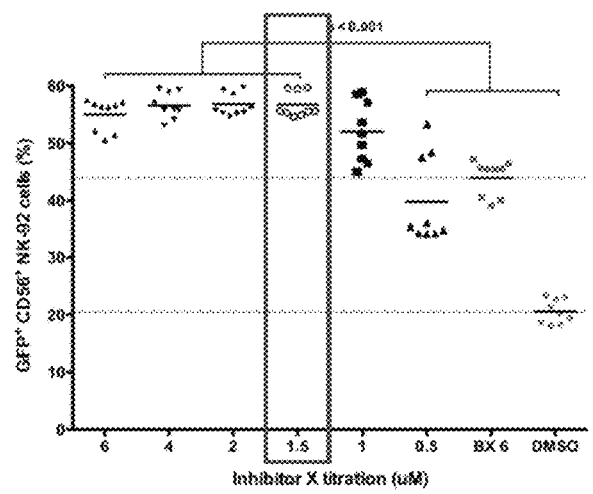
FIG. 2A is a chart showing that iX has a dose-dependent effect with minimal toxicity to NK cells. Primary human NK cells and NK-92 cells are transduced with LeGO-G2 virus in the presence of varying doses of BX795 or iX for 6 hours. GFP expression is analyzed by flow cytometry 72 hours after transduction. GFP+ cell percentages are shown on graph. Data from three independent experiments, each run in triplicates.

Testing different concentrations of iX has shown that the inhibitor, as was shown previously for BX795, has a dose-dependent effect on increasing genetic modification efficiency in NK cells (FIG. 2A). For iX, although a significant effect is seen already at 0.5 μM concentration, this effect increases even more up to 1.5 μM after which it seems to stabilize. Compared to BX795, iX performs better at lower doses and enhances lentiviral gene delivery efficiency to a significantly higher extent.

Figure 2B:
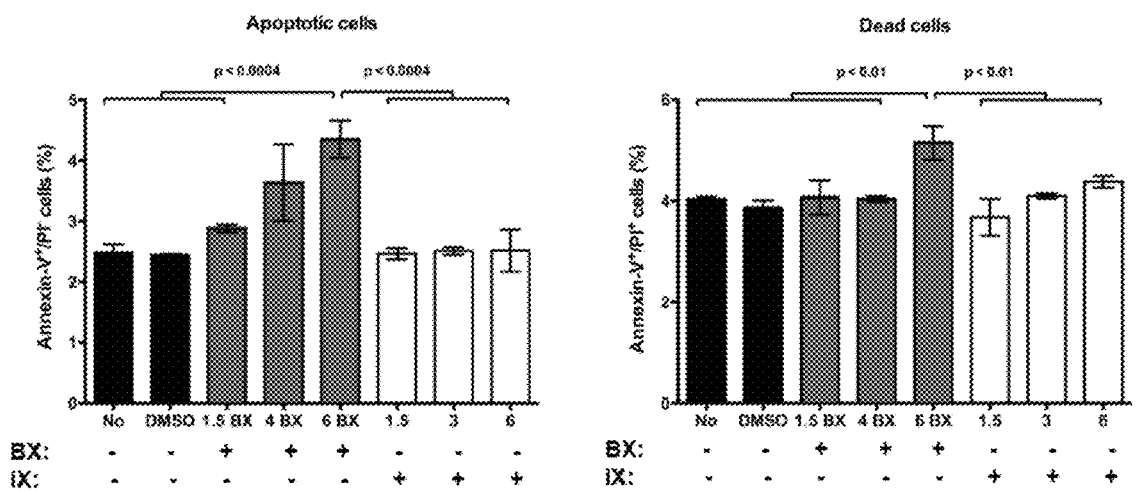
FIG. 2B contains two bar graphs comparing apoptotic to dead Annexin $-V^+/PI^-$cells.

Remarkably, the use of iX at the optimum concentration presents no immediate toxic effects on NK cells as determined by Annexin-V/PI staining after BX795 treatment (FIG. 2b). At the optimum dose of 1.5 μM, iX shows no significant toxicity on NK cells when compared to DMSO controls. At 1.5 μM, BX795 similarly shows no toxicity while at the optimum dose of 6 μM, a quite small but statistically significant increase is observed in apoptotic and dead cells in culture. Conversely, no signs of immediate toxicity to the NK cells were observed for iX even at the 6 μM concentration.

Taken together, these results indicate that iX is not only more efficient than BX795 in enhancing lentiviral gene delivery efficiency but also significantly less toxic to the cells.

iX Treatment During Lentiviral Gene Delivery Downregulates RIG-I and IRF3

Figure 3:
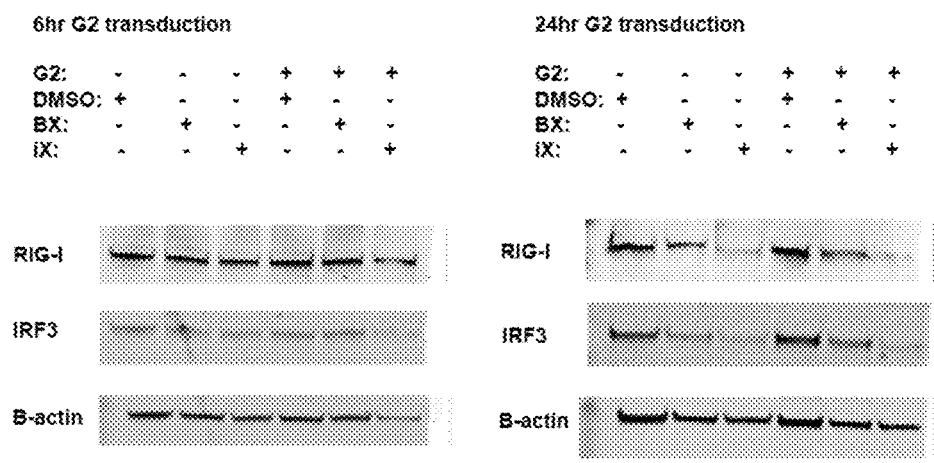
FIG. 3 contains photos of a gel showing iX treatment during lentiviral transduction decreases RIG-I and IRF-3.

In order to better characterize the effects of the inhibitors on innate immune signaling during lentiviral transduction, we have analyzed the expression of the viral RNA sensor molecule RIG-I and the transcription factor IRF3 that acts downstream of RIG-I. While the changes expression of these genes were not detectable at the protein level after the 6 hour transduction period, a significant decrease in both RIG-I and IRF3 expression attributable to the use of BX795 and iX was observed at 24 hours (FIG. 3).

Moreover, we have observed that the extent of downregulation in RIG-I and IRF3 was significantly more when iX was used, compared to the use of BX795. This might be a possible explanation to why iX performs better than BX795 in enhancing lentiviral gene delivery.

iX Treatment During Lentiviral Gene Delivery Suppresses IFNγ and TNF Responses.

Figure 4:
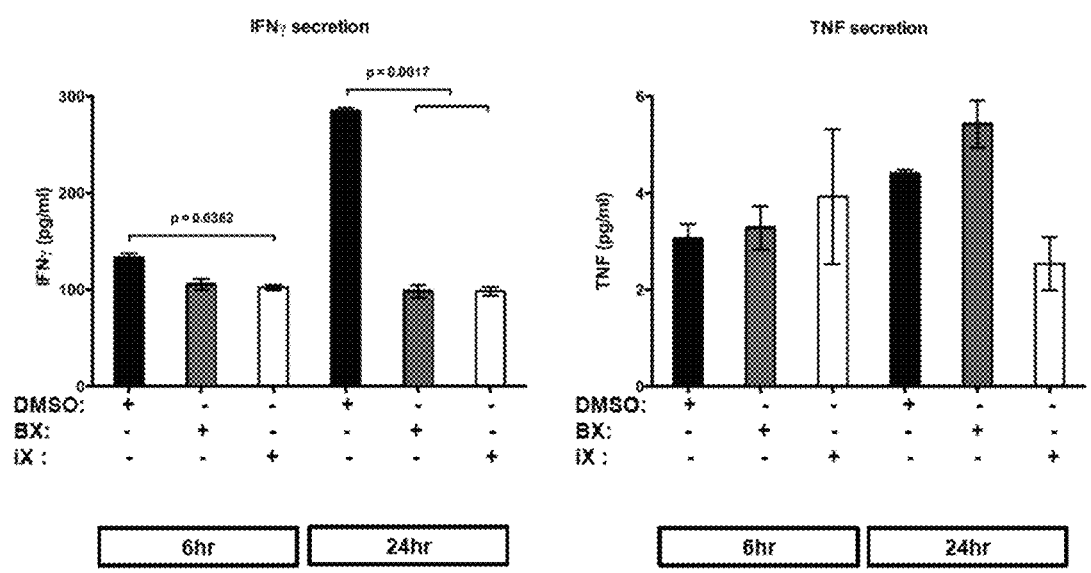
FIG. 4 contains two bar graphs showing that iX treatment interferes with anti-viral cytokines IFNγ and TNF secretion.

In order to further characterize mechanisms behind superior lentiviral gene delivery triggered by iX, we tested cytokine mediated responses upon exposure to lentiviral particles in the presence of BX795 and iX. NK92 cells treated with iX during lentiviral gene delivery, significantly decreased the secretion of anti-viral cytokine, IFNγ, already at six hours while BX795 could only significantly trigger similar effect 24 hours after the exposure to the lentiviral particles. (FIG. 4). Moreover, similar trend was observed in the same setup for an other antiviral cytokine TNF. (FIG. 4). Overall, using iX during lentiviral gene delivery is superior than BX795 and this could be due to inactivation of RIG-I pathway and downstream signaling molecule IRF-3 which leads to decreased secretion of danger signals, anti-viral cytokines. (FIG. 4).

iX and BX795 have Differential Gene Expression Profile.

Figure 5:
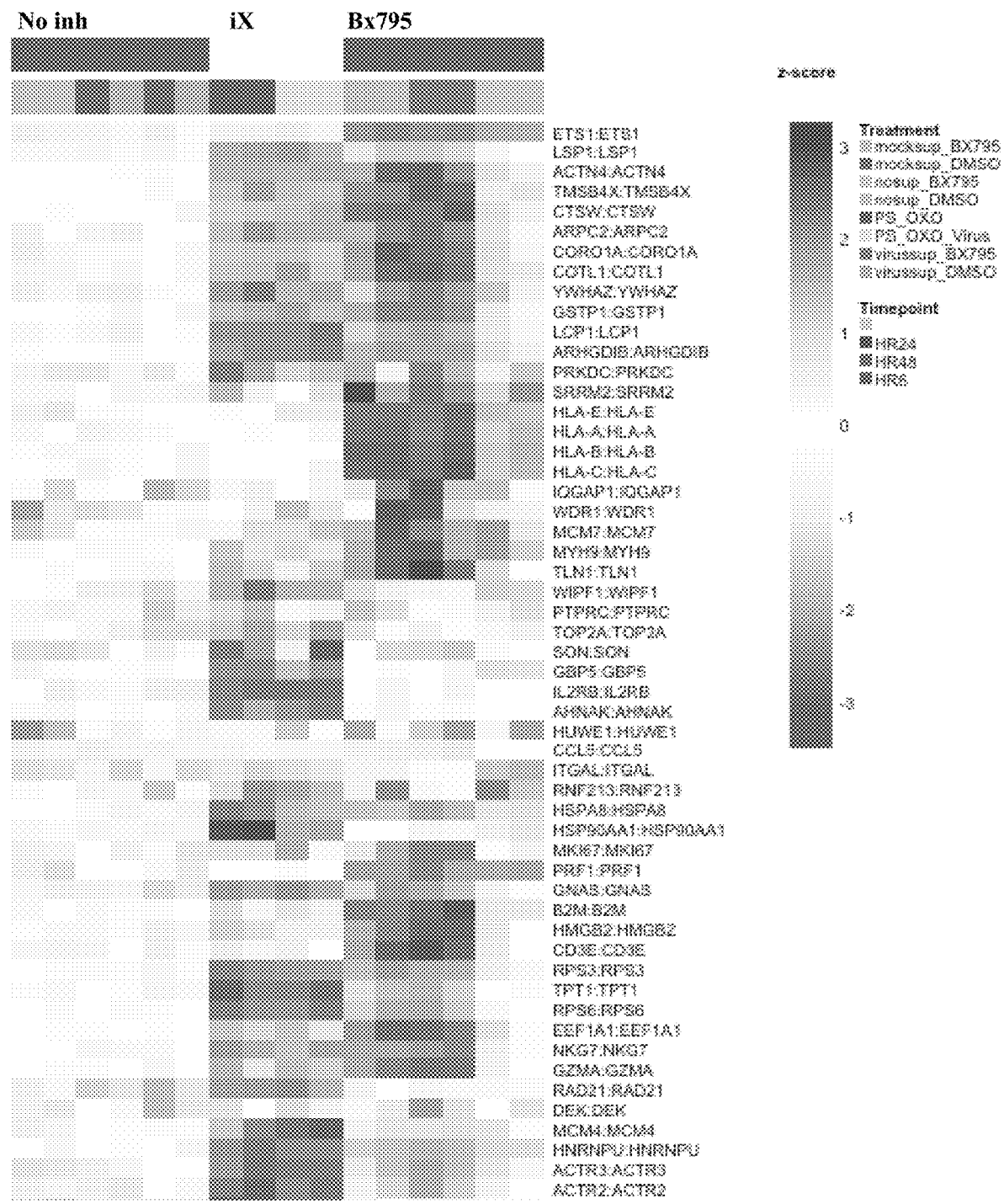
FIG. 5 is a graph showing that iX treatment has a unique transcriptome signature compared to BX795.
Figure 5:
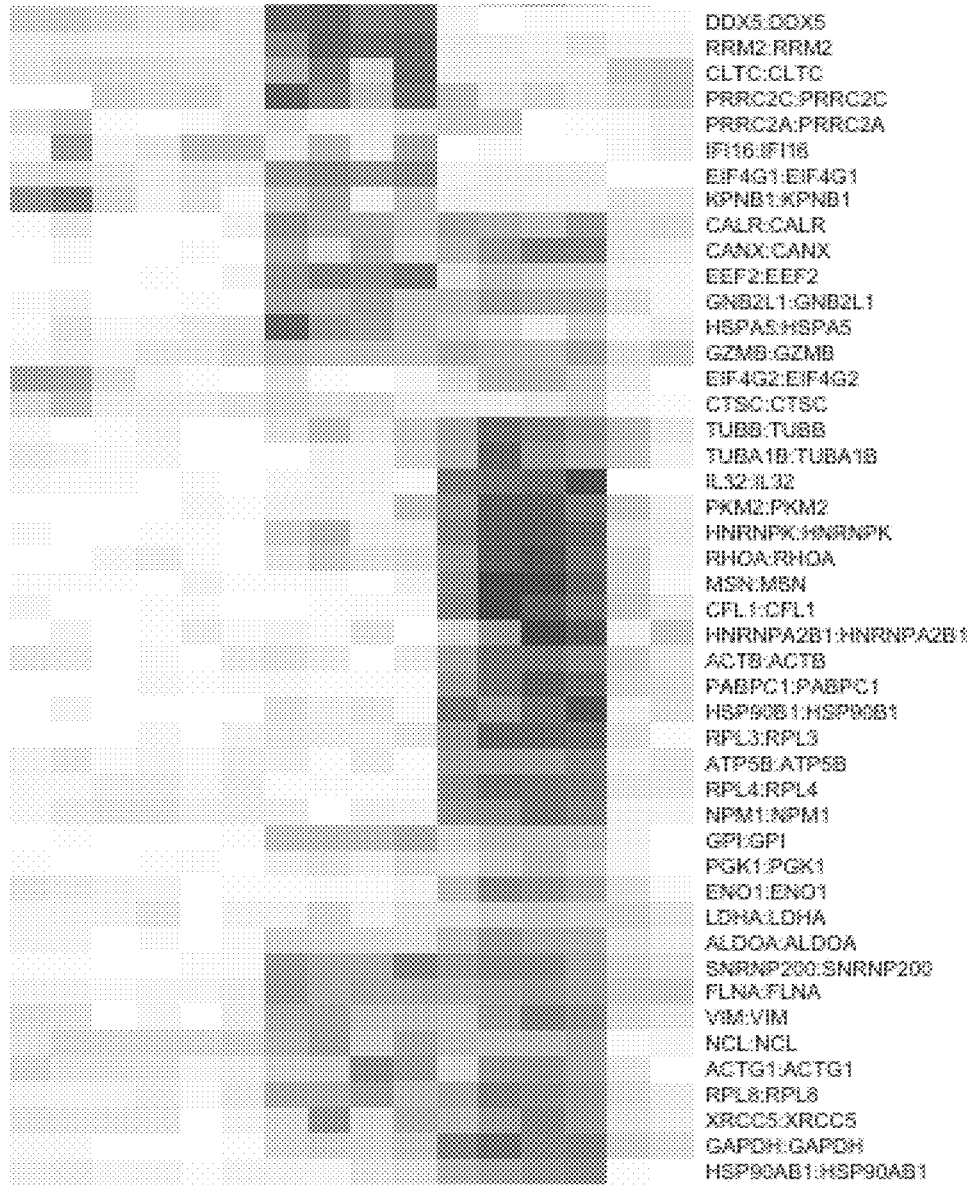
Figure 6A:
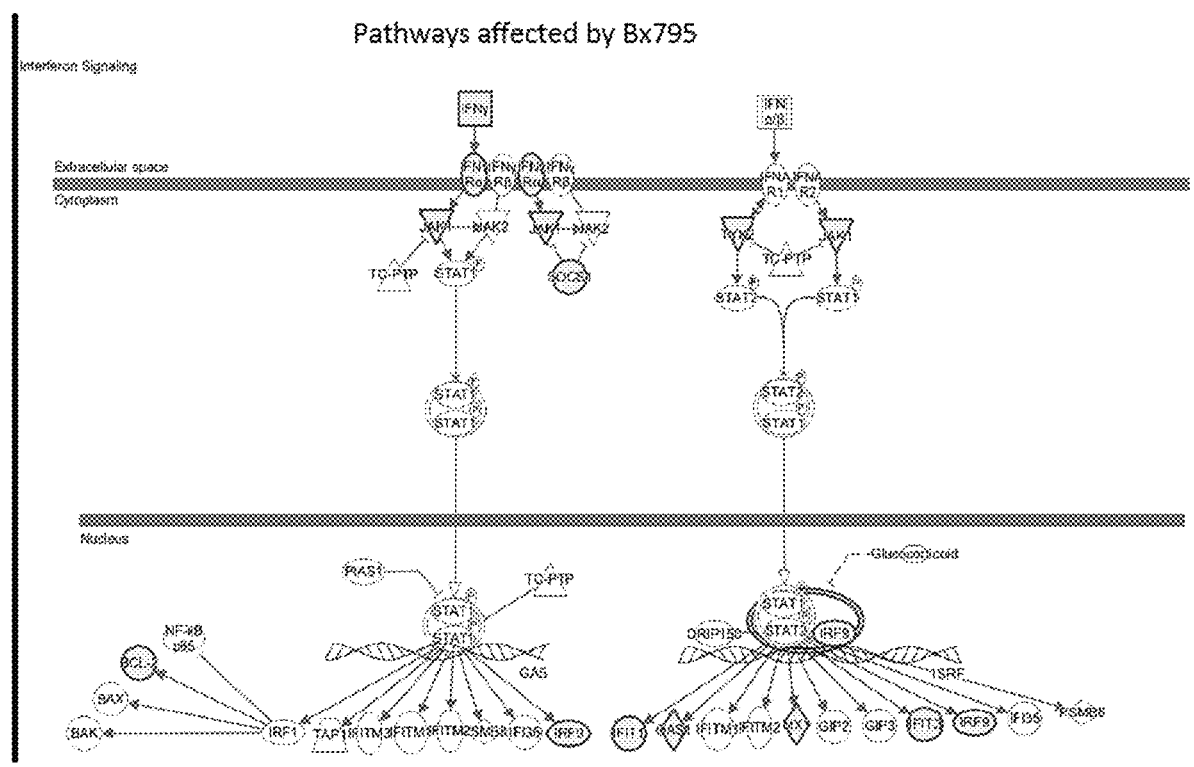
FIGS. 6A-d show the purported signaling pathways affected by BXx795.
Figure 6B:
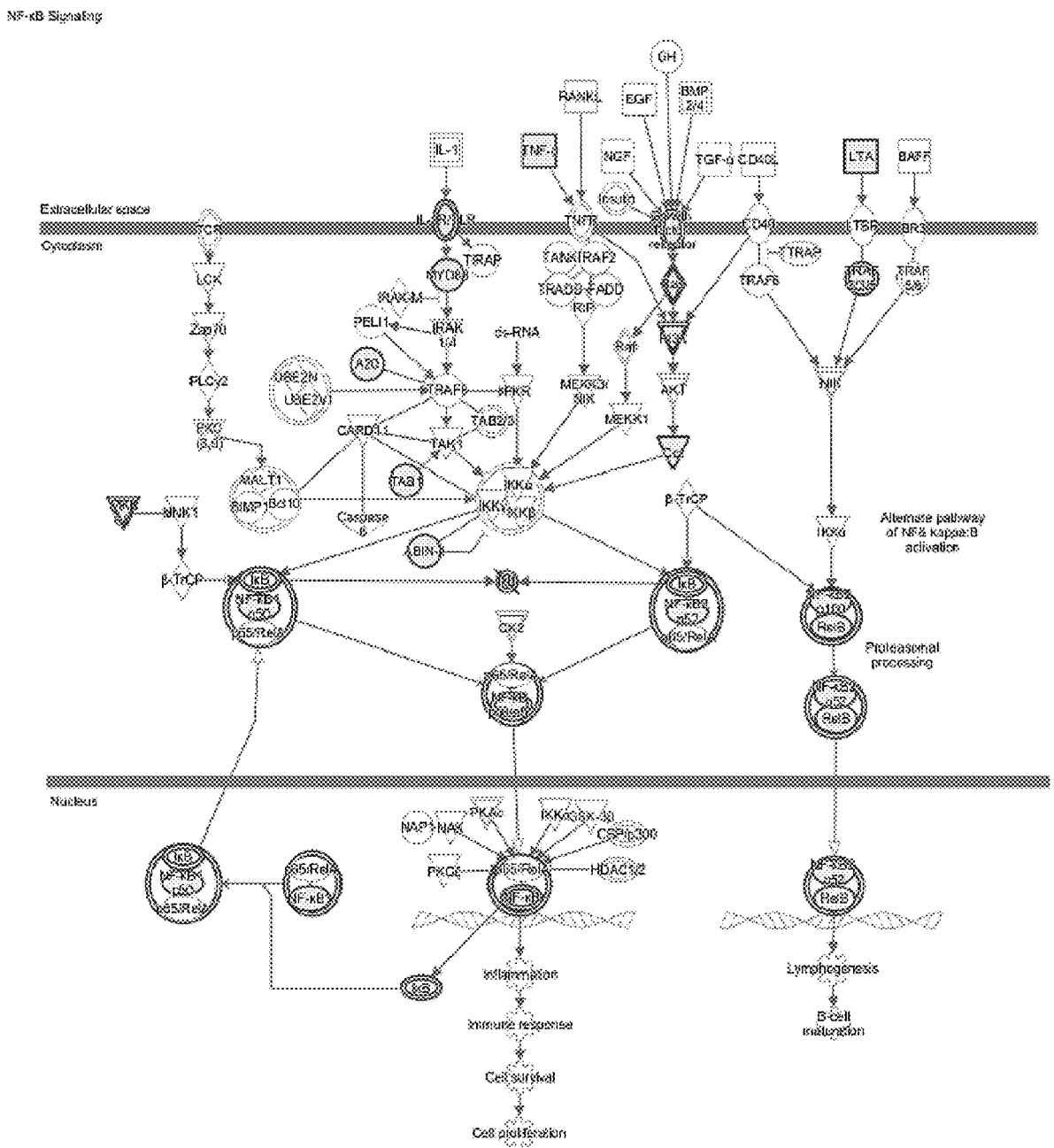
Figure 6C:
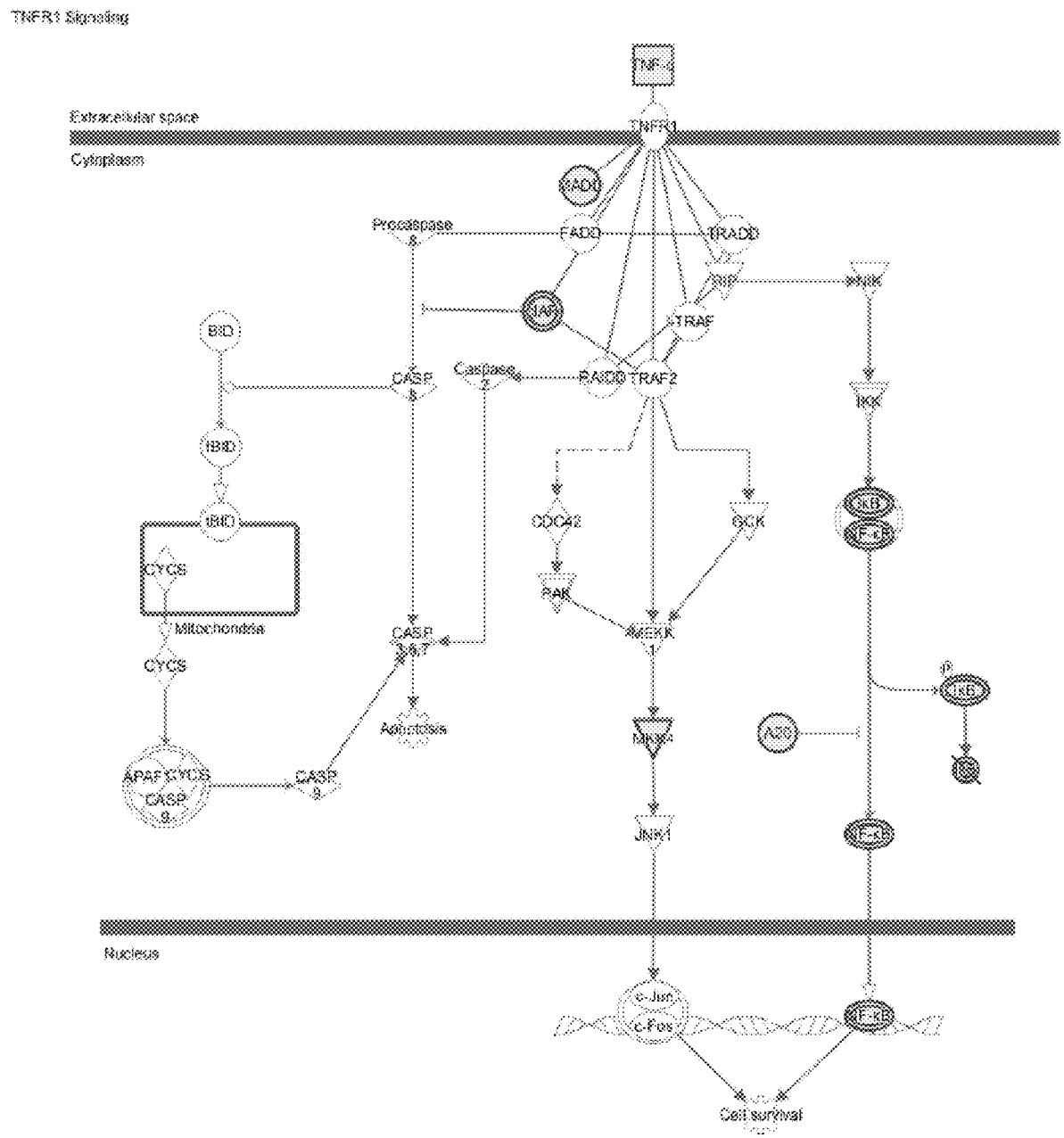
Figure 6D:
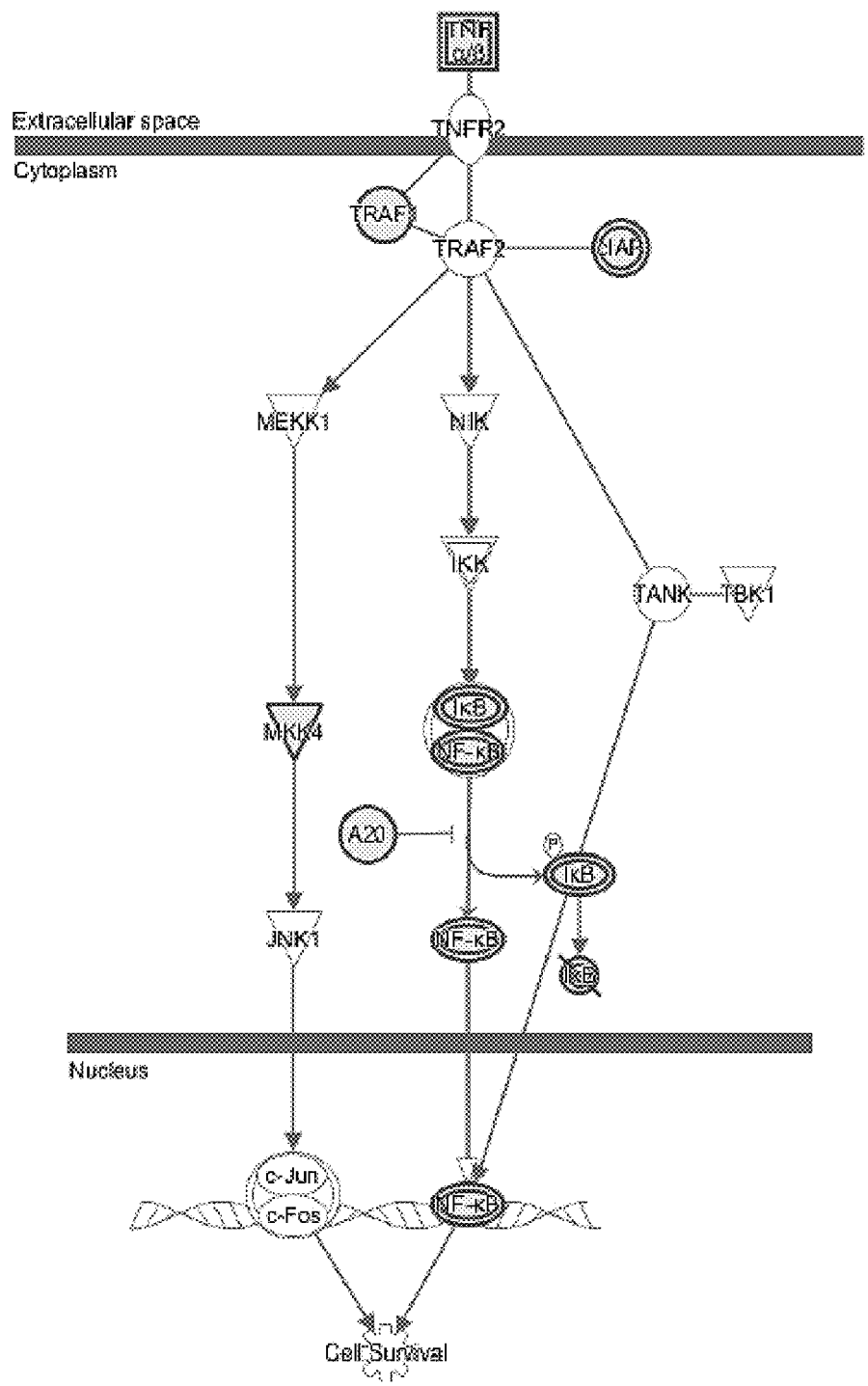
Figure 6E:
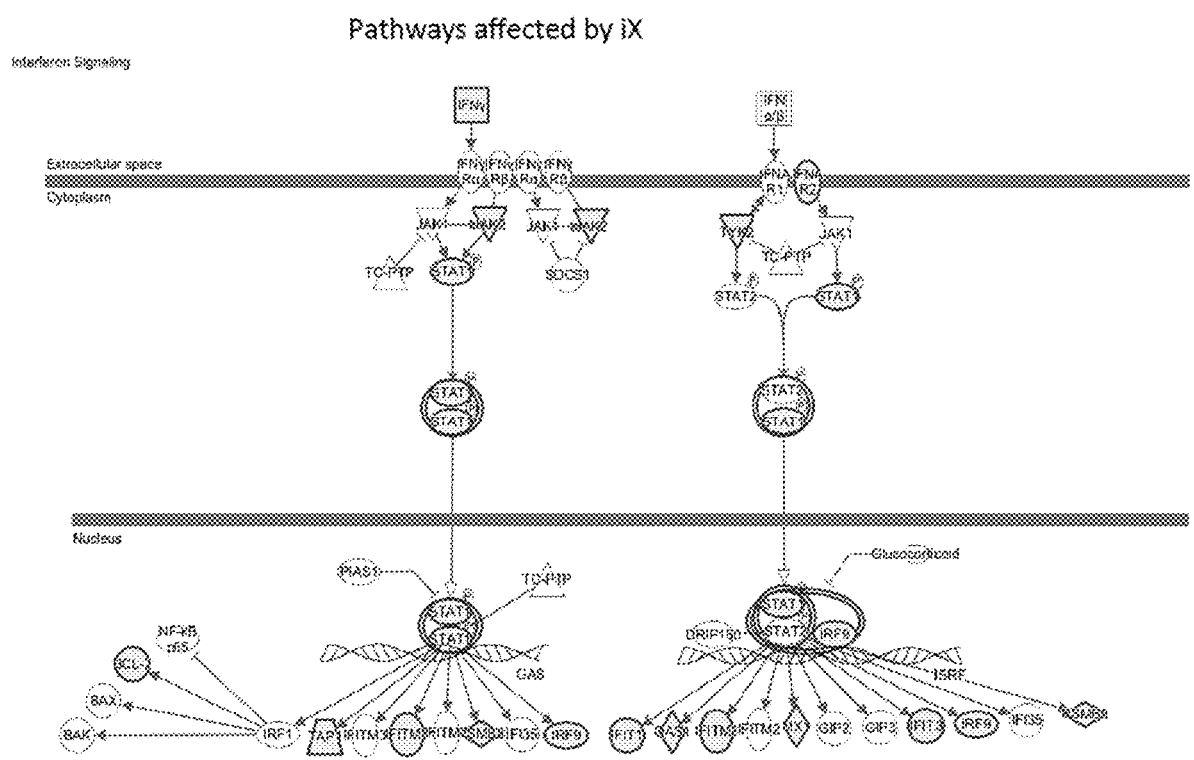
FIGS. 6E-H show the purported signaling pathways affected by iX.
Figure 6F:
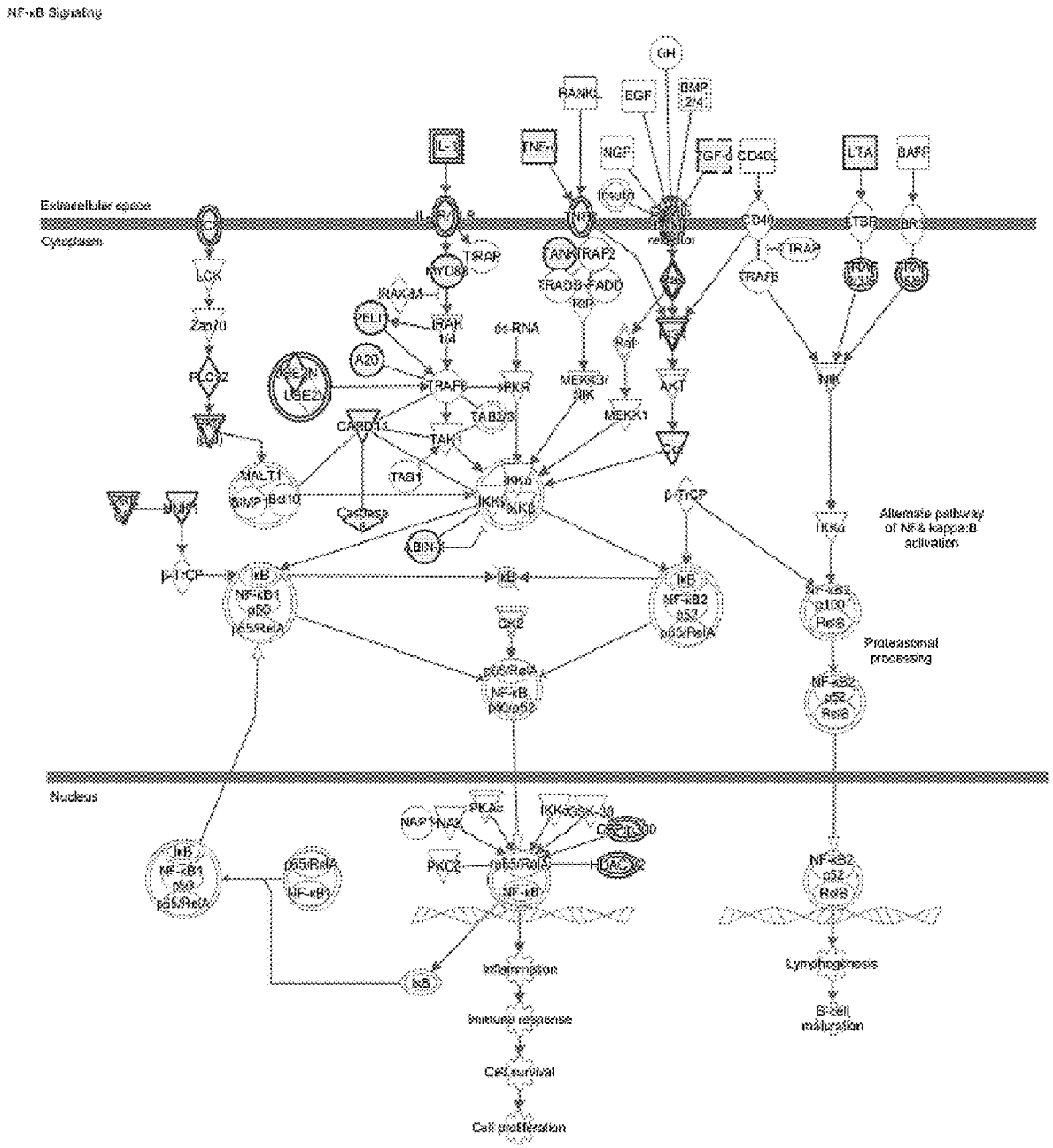
Figure 6G:
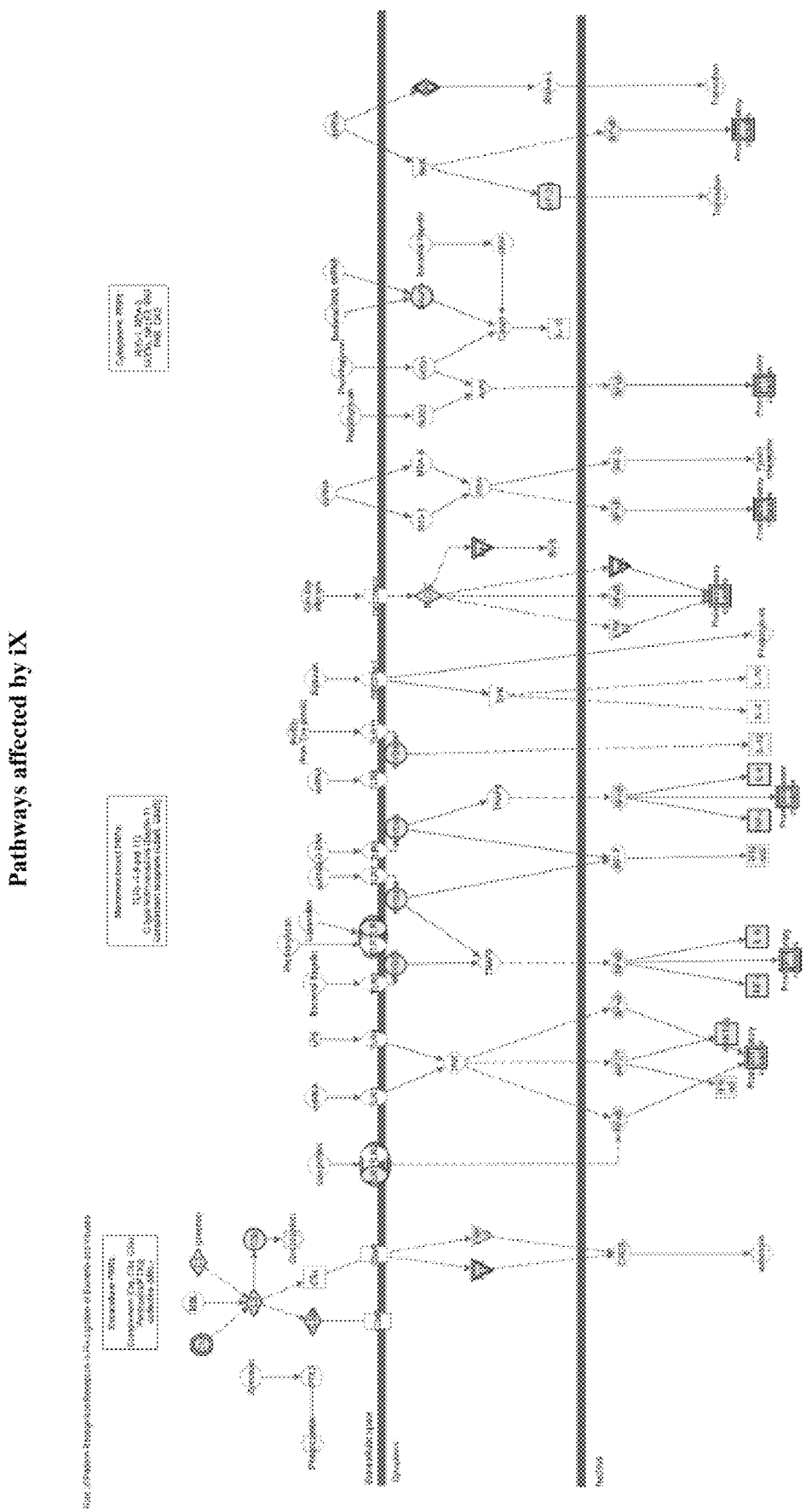
Figure 6H:
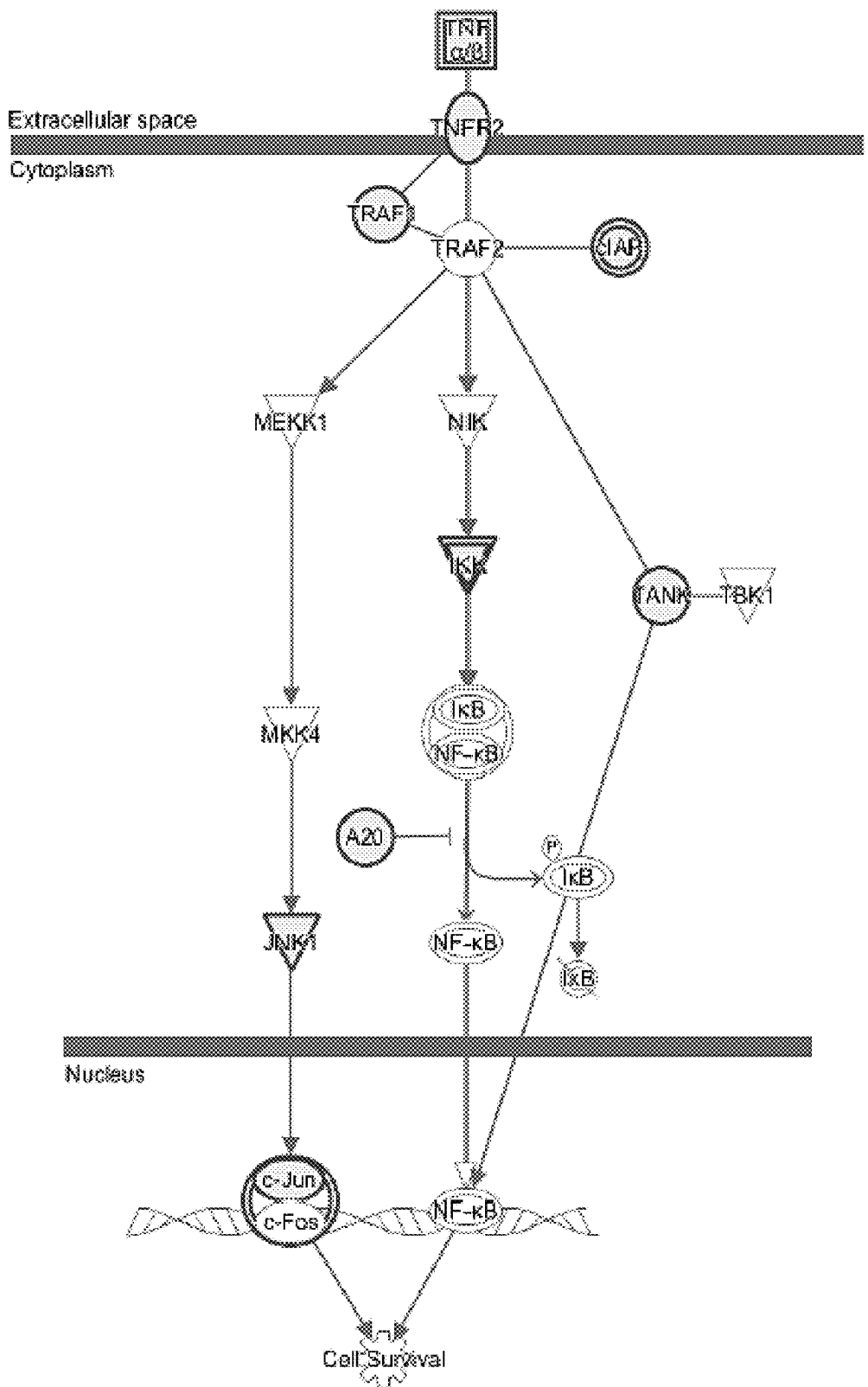

Gene expression profiling by RNAseq for identification of pathways triggered by lentivirus entry in the absence and presence of small molecule inhibitors are assessed. NK-92 cells are transduced as previously described. At the end of the 6 hour transduction protocol, RNA from the cells is extracted and sequenced on a HiSeq 2500 instrument. After quality control, the reads are mapped to the human genome using the STAR aligner and gene abundance is estimated with HT-Seq. Differential expression is analyzed using DeSeq software. Briefly, pretreatment of iX and BX795 resulted in different mRNA profiles. (FIG. 5). Moreover, in line with previous in vitro experiments, treatment of iX during lentiviral gene delivery affected pathways associated with anti-viral responses such as TNF, IFN and pattern recognition pathways (FIGS. 6E-H) whereas BX795 failed to fully suppress similar anti-viral responses at mRNA level (FIGS. 6A-D).

Example 2: In Vivo Administration

Although not recommended due to iX's inherent suppressive effect on intracellular RNA recognition pathways and the increased susceptibility for uncontrollable viral infection that would result, iX can be used for in vivo gene delivery with serum concentrations varying between 0.2 and 6 mM. Ix can be administered via injection, oral, nasal or mucosal delivery using technologies known in the art. Potential therapeutic applications of iX include cancer, liver gene therapy, single gene disorders, storage disorders as well as tumor retargeting genes.

Cancers treatable by the present invention include carcinomas, sarcomas, lymphomas, leukemias, and blastomas: acute lymphoblastic leukemia (all), acute myeloid leukemia, adrenocortical carcinoma, aids-related cancers, anal cancer, astrocytoma, basal-cell carcinoma, extrahepatic bile duct cancer (cholangiocarcinoma), bladder cancer, bone tumor (osteosarcoma/malignant fibrous histiocytoma), brainstem glioma, brain cancer, cerebral astrocytoma/malignant glioma, ependymoma, medulloblastoma, supratentorial primitive neuroectodermal tumors, visual pathway and hypothalamic glioma, breast cancer, bronchial adenomas/carcinoids, burkitt's lymphoma, central nervous system lymphoma, cervical cancer, chondrosarcoma, chronic lymphocytic leukemia, chronic myelogenous leukemia, chronic myeloproliferative disorders, colon cancer, cutaneous t-cell lymphoma, desmoplastic small round cell tumor, endometrial cancer, ependymoma, esophageal cancer, Ewing's sarcoma, intraocular melanoma, retinoblastoma, gallbladder cancer, gastric (stomach) cancer, gastrointestinal carcinoid tumor, gastrointestinal stromal tumor (gist), extracranial, extragonadal, or ovarian germ cell tumor, gestational trophoblastic tumor, glioma of the brain stem, childhood cerebral astrocytoma glioma, hairy cell leukemia, head and neck cancer, heart cancer, hepatocellular (liver) cancer, hodgkin lymphoma, intraocular melanoma, islet cell carcinoma (endocrine pancreas), kaposi sarcoma, kidney cancer (renal cell cancer), acute lymphoblastic leukaemia (also called acute lymphocytic leukemia), acute myeloid leukemia (also called acute myelogenous leukemia), chronic lymphocytic leukemia, chronic myelogenous leukemia (also called chronic myeloid leukemia), hairy cell leukemia, lip and oral cavity cancer, liposarcoma, non small cell lung cancer, small cell lung cancer, macroglobulinemia, waldenstrom, male breast cancer, malignant fibrous histiocytoma of bone/osteosarcoma, medulloblastoma, melanoma, intraocular (eye)melanoma, Merkel cell cancer, mesothelioma, metastatic squamous neck cancer with occult primary, mouth cancer, multiple endocrine neoplasia syndrome, multiple myeloma/plasma cell neoplasm, mycosis fungoides, myelodysplastic syndromes, myelodysplastic/myeloproliferative diseases, chronic myelogenous leukemia, acute myeloid leukemia, myeloid leukemia, multiple myeloma (cancer of the bone-marrow), myeloproliferative disorders, myxoma, nasal cavity and paranasal sinus cancer, nasopharyngeal carcinoma, neuroblastoma, non-small cell lung cancer, oligodendroglioma, oral cancer, oropharyngeal cancer, osteosarcoma/malignant fibrous histiocytoma of bone, ovarian cancer, ovarian epithelial cancer (surface epithelial-stromal tumor), ovarian germ cell tumor, ovarian low malignant potential tumor, pancreatic cancer, pancreatic cancer, paranasal sinus and nasal cavity cancer, parathyroid cancer, penile cancer, pharyngeal cancer, pheochromocytoma, pineal astrocytoma, pineal germinoma, pineoblastoma and supratentorial primitive neuroectodermal tumors, pituitary adenoma, plasma cell neoplasia/multiple myeloma, pleuropulmonary blastoma, primary central nervous system lymphoma, prostate cancer, rectal cancer, renal cell carcinoma (kidney cancer), renal pelvis and ureter transitional cell cancer, retinoblastoma, rhabdomyosarcoma, salivary gland cancer, soft tissue sarcoma, uterine sarcoma, Sézary syndrome, melanoma and non-melanoma skin cancer, merkel cell skin carcinoma, small cell lung cancer, small intestine cancer, soft tissue sarcoma, squamous cell carcinoma, squamous neck cancer with occult primary, stomach cancer, supratentorial primitive neuroectodermal tumor, t-cell lymphoma (mycosis fungoides and sézary syndrome), testicular cancer, throat cancer, thymoma and thymic carcinoma, thyroid cancer, transitional cell cancer of the renal pelvis and ureter, trophoblastic tumor, ureter and renal pelvis transitional cell cancer, urethral cancer, uterine cancer, uterine sarcoma, vaginal cancer, visual pathway and hypothalamic glioma, vulvar cancer, Waldenström macroglobulinemia, Wilms tumor (kidney cancer).

The present invention is also useful in treating genetic disorders such as: 21-hydroxylase deficiency, achondroplasia, acute intermittent *porphyria*, adenylosuccinate lyase deficiency, Adrenoleukodystrophy, Alagille syndrome, Alexander disease, Alström syndrome, Amelogenesis imperfecta, biotinidase deficiency, CGD Chronic granulomatous disorder, Di George's syndrome, fanconi anemia, G6PD deficiency, lipoprotein lipase deficiency, Muscular dystrophy, Duchenne type, Siderius X-linked mental retardation syndrome caused by mutations in the PHF8 gene, X-linked severe combined immunodeficiency (X-SCID), X-linked sideroblastic anemia (XLSA).

Metabolic disoders treatable with the present invention include: Niemann-Pick disease, Tay-Sachs disease, Gaucher disease, Fabry disease.

Example 3: Adoptive Cell Transfer

In a most preferred use, iX is used to treat cells prior to adoptive cell transfer to a patient. Using the protocols described above iX can be used at any time during ex vivo manipulation. Preferred concentration of iX in culture ranges are from about 0.4 mM to about 10 mM. Most preferred is 0.5 mM to 6 mM These cells can thereby be immediately infused or frozen for a later infusion time point using protocols well known in the art. iX administration can be done both in vivo and ex vivo as a single dose or repetitively using the dose window where serum concentration of the inhibitor can be between 0.4-6 uM, preferentially the lower dose. Such adoptive cell transfer can be used to treat the conditions described under Example 2 above.

Example 4 Treatment of Viral Inflammation

The present invention can also be used to treat patients suffering from inflammation caused by a viral infection such as myositis, myocarditis, viral arthritis, viral encephalitis and meningitis. In such diseases iX can be co-administered with anti viral therapy to reduce or stop the recognition of the virus by the immune system thereby reducing, preventing or eliminating inflammation. This could only be used with antiviral therapies that do not rely on or fully utilize immune responses. Such antivirals include: adamantane antivirals such as amandatind and rimantidine; antiviral boosters such as ritonavir and cobicistat; chemokine receptor antagonists such as maraviroc; integrase strand transfer inhibitors such as maraviroc, dolutegravir and elvitegravir; miscellaneous antivirals such as sofosbuvir, enfuvirtide, foscarnet and fomivirsen; neuraminidase inhibitors such as peramivir, oseltamivir and zanamivir; non nucleoside reverse transcriptase inhibitors (NNRTIs) such as favirenz, nevirapine, delavirdine, etravirine andrilpivirine; NS5a inhibitors such as daclatasvir; nucleoside reverse transcriptase inhibitors (NRTIs) such as zidovudine, didanosine, stavudine, lamivudine, abacavir, emtricitabine and entecavir; protease inhibitors such as saquinavir, ritonavir,i ndinavir, nelfinavir, amprenavir, lopinavir, atazanavir, fosamprenavir, tipranavir and darunavir; and purine nucleosides such as ribavirin valacyclovir, famciclovir, acyclovir, ganciclovir, valganciclovir and cidofovir. Dosing instructions for these drugs alone and in combination are well known in the art.

Example 5: Increasing In Vivo Efficacy of RNA Viral Therapies

The present invention is also useful when administered in vivo to increase in vivo efficacy of RNA virus based oncolytic virus therapies such as vesicular stomatitis virus, poliovirus, reovirus, senecavirus, ECHO viruses such as Rigvir for indications such as bladder carcinoma, brain tumors, gynecological tumors, Hepatocellular carcinoma, melanoma, multiple myeloma, prostate carcinoma, soft tissue sarcoma and Solid tumors. The iX would help inhibit intracellular antiviral defense mechanisms thus increase the efficacy of distribution of the oncolytic virus within the tumor. Target serum levels for in vivo administration of iX are between 0.2 and 6 mM.

Thus, while there have been described what are presently believed to be the preferred embodiments of the present invention, those skilled in the art will realize that other and further embodiments can be made without departing from the spirit of the invention, and it is intended to include all such further modifications and changes as come within the true scope of the claims set forth herein.

REFERENCES

Alici, E., Sutlu, T., and Sirac Dilber, M. (2009). Retroviral gene transfer into primary human natural killer cells. *Methods Mol Biol* 506, 127-137.

Brandstadter, J. D., and Yang, Y. (2011). Natural killer cell responses to viral infection. *J Innate Immun* 3, 274-279.

Clark, K., Plater, L., Peggie, M., and Cohen, P. (2009). Use of the pharmacological inhibitor BX795 to study the regulation and physiological roles of TBK1 and IkappaB kinase epsilon: a distinct upstream kinase mediates Ser-172 phosphorylation and activation. *J Biol Chem* 284, 14136-14146.

Lanier, L. L. (2008). Evolutionary struggles between NK cells and viruses. *Nat Rev Immunol* 8, 259-268.

Pegram, H. J., Kershaw, M. H., and Darcy, P. K. (2009). Genetic modification of natural killer cells for adoptive cellular immunotherapy. *Immunotherapy* 1, 623-630.

Sutlu, T., Nystrom, S., Gilljam, M., Stellan, B., Applequist, S. E., and Alici, E. (2012). Inhibition of intracellular antiviral defense mechanisms augments lentiviral transduction of human natural killer cells: implications for gene therapy. *Hum Gene Ther* 23, 1090-1100.

We claim:

1. A method of enhancing gene delivery to cells comprising the co-administration of (5Z)-7-Oxozeaenol along with an RNA viral vector to a cell in a nutrient media.

2. The method of claim 1 wherein the RNA viral vector is a lentiviral vector.

3. The method of claim 1 wherein the cells are selected from natural killer, stem cells and macrophages.

4. The method of claim 3 wherein the cells are natural killer cells are NK92 cells.

5. The method of claim 1 wherein the (5Z)-7-Oxozeaenol is administered in an amount sufficient to achieve a concentration from about 0.04 µM to about 10 µM in the nutrient media.

6. The method of claim 1, wherein (5Z)-7-Oxozeaenol in a concentration from about 0.04 µM to about 10 µM in nutrient media is administered.

7. The method of claim 6, wherein (5Z)-7-Oxozeaenol in a concentration from 0.4 to about 1.5 µM is administered.

8. The method of claim 6 wherein (5Z)-7-Oxozeaenol in a concentration from about 0.5 µM to about 6 µM is administered.

9. The method of claim 1 further comprising the administration of the cells to a patient having a disease that is treatable with adoptive cell transfer.

10. The method of claim 1 wherein (5Z)-7-Oxozeaenol is administered to achieve a target concentration of 0.2 µM and 6 µM.

11. The method of claim 10 wherein the concentration of (5Z)-7-Oxozeaenol is 0.2 µM to 1.5 µM.

12. A method of enhancing gene transfer in natural killer cells via an RNA viral vector comprising co-administration of (5Z)-7-Oxozeaenol along with an RNA viral vector to a natural killer cell in a nutrient media.

13. The method of claim 12 wherein the vector is a lentiviral vector.

14. The method of claim 13 wherein (5Z)-7-Oxozeaenol is added to achieve a concentration of 0.4 μM to about 10 μM in the nutrient media.

15. A method of increasing the efficacy of an in vivo virus based therapeutic comprising the co-administration of (5Z)-7-Oxozeaenol together with an RNA based viral therapy.

* * * * *

SEQUENCE LISTING

```
<160> NUMBER OF SEQ ID NOS: 15

<210> SEQ ID NO 1
<211> LENGTH: 20
<212> TYPE: DNA
<213> ORGANISM: artificial sequence
<220> FEATURE:
<223> OTHER INFORMATION: CRISPR gRNA

<400> SEQUENCE: 1
gatgtctcgc tccgtggcct                                           20

<210> SEQ ID NO 2
<211> LENGTH: 20
<212> TYPE: DNA
<213> ORGANISM: artificial sequence
<220> FEATURE:
<223> OTHER INFORMATION: CRISPR gRNA

<400> SEQUENCE: 2
ctcgcgctac tctctctttc                                           20

<210> SEQ ID NO 3
<211> LENGTH: 20
<212> TYPE: DNA
<213> ORGANISM: artificial sequence
<220> FEATURE:
<223> OTHER INFORMATION: CRISPR gRNA

<400> SEQUENCE: 3
gactcacgct ggatagcctc                                           20

<210> SEQ ID NO 4
<211> LENGTH: 20
<212> TYPE: DNA
<213> ORGANISM: artificial sequence
<220> FEATURE:
<223> OTHER INFORMATION: CRISPR gRNA
```

```
<400> SEQUENCE: 4
ccagaaagag agagtagcgc                                              20

<210> SEQ ID NO 5
<211> LENGTH: 20
<212> TYPE: DNA
<213> ORGANISM: artificial sequence
<220> FEATURE:
<223> OTHER INFORMATION: CRISPR gRNA

<400> SEQUENCE: 5
cacagctaag gccacggagc                                              20

<210> SEQ ID NO 6
<211> LENGTH: 20
<212> TYPE: DNA
<213> ORGANISM: artificial sequence
<220> FEATURE:
<223> OTHER INFORMATION: CRISPR gRNA

<400> SEQUENCE: 6
ggccgagatg tctcgctccg                                              20

<210> SEQ ID NO 7
<211> LENGTH: 20
<212> TYPE: DNA
<213> ORGANISM: artificial sequence
<220> FEATURE:
<223> OTHER INFORMATION: CRISPR gRNA

<400> SEQUENCE: 7
ttgcgggagc gcatgccttt                                              20

<210> SEQ ID NO 8
<211> LENGTH: 20
<212> TYPE: DNA
<213> ORGANISM: artificial sequence
<220> FEATURE:
<223> OTHER INFORMATION: CRISPR gRNA

<400> SEQUENCE: 8
ccacctcttg atggggctag                                              20

<210> SEQ ID NO 9
<211> LENGTH: 20
<212> TYPE: DNA
<213> ORGANISM: artificial sequence
<220> FEATURE:
<223> OTHER INFORMATION: CRISPR gRNA

<400> SEQUENCE: 9
ataccttggg ttgatccact                                              20

<210> SEQ ID NO 10
<211> LENGTH: 20
<212> TYPE: DNA
<213> ORGANISM: artificial sequence
<220> FEATURE:
<223> OTHER INFORMATION: CRISPR gRNA

<400> SEQUENCE: 10
cgtgagtaaa cctgaatctt                                              20

<210> SEQ ID NO 11
<211> LENGTH: 20
```

```
<212> TYPE: DNA
<213> ORGANISM: artificial sequence
<220> FEATURE:
<223> OTHER INFORMATION: CRISPR gRNA

<400> SEQUENCE: 11
aagtcaactt caatgtcgga                                          20

<210> SEQ ID NO 12
<211> LENGTH: 20
<212> TYPE: DNA
<213> ORGANISM: artificial sequence
<220> FEATURE:
<223> OTHER INFORMATION: CRISPR gRNA

<400> SEQUENCE: 12
catagatcga gacatgtaag                                          20

<210> SEQ ID NO 13
<211> LENGTH: 20
<212> TYPE: DNA
<213> ORGANISM: artificial sequence
<220> FEATURE:
<223> OTHER INFORMATION: CRISPR gRNA

<400> SEQUENCE: 13
gctactctct ctttctggcc                                          20

<210> SEQ ID NO 14
<211> LENGTH: 20
<212> TYPE: DNA
<213> ORGANISM: artificial sequence
<220> FEATURE:
<223> OTHER INFORMATION: CRISPR gRNA

<400> SEQUENCE: 14
acccaaacca agcctttcta                                          20

<210> SEQ ID NO 15
<211> LENGTH: 19
<212> TYPE: DNA
<213> ORGANISM: artificial sequence
<220> FEATURE:
<223> OTHER INFORMATION: CRISPR gRNA

<400> SEQUENCE: 15
ataagtggag gcgtcgcgc                                           19
```